United States Patent [19]
Torrance

[11] Patent Number: 5,236,589
[45] Date of Patent: Aug. 17, 1993

[54] OIL RECOVERY METHOD AND APPARATUS

[75] Inventor: George Torrance, Niagara-on-the-Lake, Canada

[73] Assignee: Environmental Technologies & Remediations, Inc., Washington, D.C.

[21] Appl. No.: 779,857

[22] Filed: Oct. 21, 1991

[51] Int. Cl.⁵ ............................................. E02B 15/04
[52] U.S. Cl. .................................. 210/608; 210/616; 210/671; 210/691; 210/170; 210/211.1; 210/242.4; 210/922; 210/924; 435/281
[58] Field of Search ..................... 210/170, 205, 221.1, 210/242.4, 242.3, 608, 616, 671, 691, 922, 923, 924, 747; 435/179, 264, 281

[56] References Cited

U.S. PATENT DOCUMENTS

| | | | |
|---|---|---|---|
| 3,414,511 | 12/1968 | Hitzman | 210/671 |
| 3,464,920 | 9/1969 | Pirson et al. | 210/924 |
| 3,591,524 | 7/1971 | Eriksen | 210/924 |
| 3,723,307 | 3/1973 | Hunter | 210/671 |
| 3,812,031 | 5/1974 | McCoy et al. | 210/671 |
| 3,843,517 | 10/1974 | McKinney et al. | 210/922 |
| 3,856,667 | 12/1974 | Azarowicz | 210/922 |
| 4,416,860 | 11/1983 | Heitkamp et al. | 210/170 |
| 5,035,804 | 7/1991 | Stowe | 210/671 |

Primary Examiner—Peter Hruskoci
Assistant Examiner—Christopher Upton
Attorney, Agent, or Firm—Spensley Horn Jubas & Lubitz

[57] ABSTRACT

A system for recovering oil from an oil spill site. A vessel transports buoyant, oil absorbent material to the spill site. The absorbent material is dispersed below the water surface and advances upward toward the water surface, thereby absorbing oil and water. The dispersed absorbent material is contained and transferred back to the vessel. Oil and water are removed from the absorbent material on the vessel, and the absorbent material may be reused.

9 Claims, 2 Drawing Sheets

OIL RECOVERY METHOD AND APPARATUS

BACKGROUND OF THE INVENTION

1. Field of the Invention

The present invention relates to a unique method and apparatus for oil recovery, and more particularly to a unique method and apparatus for dispersing oil absorbent material from the water, and recycling the oil saturated absorbent material.

2. Description of Related Art

As the use of hydrocarbon fuel continues to increase, the number of vessels used to transport such fuel on waterways has also increased, creating a higher incidence of oil spills on the high seas. It is estimated that an oil spill of two thousand tons or more occurs daily on our planet. An oil spill may cover tens of square miles. If a section of the spill breaks away and adheres to a reef or a rocky shoreline, it becomes very difficult to gain access to the oil. These oil spill incidents have had an adverse impact on marine life, wildlife and human health.

Various methods have been employed to cope with oil spills. However, such prior art methods suffer from a number of disadvantages.

For example, it is known to use prior art oil skimmers of varying length to skim across the water surface, pick up oil spilled on the water surface, and pump the oil saturated water through a hose to an oil separation process where the oil and water may be separated. Such prior art oil skimmer techniques rely on relatively calm seas for efficient operation. Such techniques are far less effective in high winds and rough seas. Moreover, such prior art oil skimmer techniques are not very effective in retrieving spilled oil that is trapped in the water column, which may extend three to ten feet below the surface of the water.

It has been proposed that loose, lightweight oil absorbent material (such as peat moss, for example) may be transported via helicopter to the site of an oil spill and may be directed onto the water surface by the down draft created by the helicopter blades. However, the helicopter down draft tends to drive the spilled oil away from the helicopter, thereby minimizing the effectiveness of such a system for oil retrieval. It is also difficult to use such a system in high winds. If the absorbent material is very light, then the material becomes easily airborne and creates a dust cloud, obscuring the oil spill site. If the winds are high, then much of the absorbent material may be lost. Even if such absorbent material is deployed successfully, there remains a problem with removing the material from the water after the material has absorbed the oil.

It has been proposed that oil spills may be retrieved by means of absorbent booms or absorbent pads. However, such absorbent booms or pads must be disposed of after use and are typically destroyed by incineration or buried. There is a significant economic cost as well as an environmental cost associated with the disposal of such absorbent booms or absorbent pads.

It is an object of the present invention to provide an improved oil spill retrieval system which can be used on rough seas and in high winds (including winds of over forty miles per hour).

It is a further object of the present invention to provide an improved oil spill retrieval system which produces little or no negative environmental impact.

It is a further object of the present invention to provide an improved oil spill retrieval system which is cost effective and which utilizes products that are abundantly available.

SUMMARY OF THE INVENTION

In accordance with the present invention, these and other objectives are achieved by providing an absorbent, substantially granular material for absorbing and retaining oil. The absorbent material is preferably light weight and buoyant, so that it will stay afloat in water for an extended period of time after absorbing oil.

The absorbent material is transported to the site of an oil spill via a vessel. The vessel is equipped with a feed system for dispersing the absorbent material on the water. The feed system is adjustable so that the absorbent material may be dispersed either above the water surface of below the water surface. In the latter case, the buoyant absorbent material will catch oil sinking below the water surface and will drive this sinking oil up toward the water surface. Oil that is trapped in the water column several feet below the water surface may therefore be retrieved.

The oil saturated absorbent material remains suspended on the water surface and is recovered by a recovery vessel. In a preferred embodiment of the invention, the same vessel is used for both dispersing the absorbent material and recovering the oil saturated absorbent material. The recovery vessel includes a system for lifting the oil saturated absorbent material out of the water and transferring the saturated absorbent material onto the vessel.

On the recovery vessel, the oil saturated material is advanced toward an oil stripping area, where the oil is water are separated from the saturated absorbent material. The oil stripping process is capable of removing as much as 99% of the oil and water from the saturated absorbent material. The oil removed from the absorbent material may be barrelled and shipped back to the supplier. The stripped absorbent material may be recycled and repeatedly dispersed in the oil spill site.

In an alternative embodiment, the stripped absorbent material may be transferred from the oil stripping area to an inoculation area prior to reuse. There, the absorbent material may be inoculated with an agent that will subsequently enhance the biodegradation of oil suspended in the absorbent material.

BRIEF DESCRIPTION OF THE DRAWINGS

A detailed description of the preferred embodiments of the invention will be made with reference to the accompanying drawings.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

Absorbent Material

Although a number of different products may be used as an absorbent material in the present invention, the preferred absorbent material is a product comprising small granules of cork, having a size of approximately fifteen mm or less. Granulated cork has a number of properties that make it particularly well suited for recovering spilled oil.

Granulated cork is oleophilic (i.e., granulated cork attracts oil). Granulated cork has natural capillaries which, like an ink blotter, enable it to hold oil inside. The rate at which granulated cork particles pick up oil may be increased approximately ten to twenty times by putting the granules through a heat treating process.

Once granulated cork absorbs oil, it retains the oil. Consequently, if oil saturated granulated cork is washed onto a shoreline, it is a relatively simple matter to remove the oil saturated granulated cork particles from the shoreline (by vacuum, for example).

Granulated cork is hydrophobic (i.e. granulated cork repels water), buoyant and relatively light weight. Granulated cork will stay afloat in water for an extended period of time and will not sink, even after absorbing oil. Oil absorbed by granulated cork can be removed and the granulated cork may be used repeatedly. Granulated cork is a naturally occurring product which grows in abundance and which can be found in virtually unlimited supply. Granulated cork generates virtually no hazardous waste and will generally not be harmful if accidently ingested by marine life or wildlife.

Feed System

Figure 1:
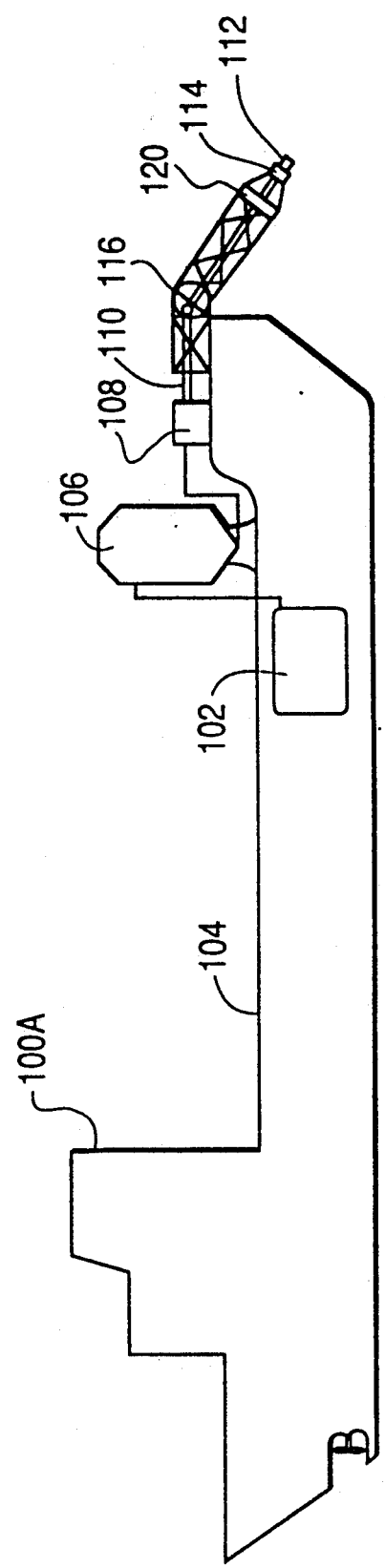
FIG. 1 shows a vessel for transporting absorbent material to the site of an oil spill.

As shown in FIG. 1 with respect to a preferred embodiment of the present invention, the absorbent material is transported to the site of the oil spill via a vessel 100A. The absorbent material may be stored in one or more containers 102 located below the deck 104 of the vessel 100A. The absorbent material may be directed by a pneumatic system (not shown) from the containers 102 to one or more silos 106 located on or above the deck 104 of the vessel 100A. The silos 106 may preferably be configured to hold approximately two to three tons of the absorbent material. The absorbent material is preferably fed from the containers 102 to the silos 106 continuously, so that the same approximate amount of absorbent material may be maintained in the silos 106 at all times during the oil recovery operation.

When the absorbent material leaves the silos 106, it may be mixed with water via a centrifugal pump 108. This reduces the possibility of the absorbent material jamming the feed system. The centrifugal pump 108 moves the mixture of absorbent material and water down through individual feed lines 110 to a plurality of dispersement jets or nozzles 112 located on a feed bar 114. The absorbent material exits from the dispersement nozzles 112 located on the feed bar 114.

This arrangement enables an even distribution of absorbent material in the water. When the absorbent material exits the dispersement nozzles 112, the absorbent material fans out. In the preferred embodiment, one of the dispersement nozzles 112 would typically disperse absorbent material across a width of approximately four feet.

The feed bar 114 is moveable by means of a gantry system 116. The gantry system 116 is operable to move the feed bar 114 horizontally out over the bow 118 of the vessel 100A. In the preferred embodiment of the invention, the feed bar 114 mounted on the gantry system 116 may project over the bow 118 of the vessel 100A by approximately twenty feet.

The gantry system 116 may be used to tilt the feed bar 114 downward at an angle. In the preferred embodiment, the angle at which the feed bar 114 may be tilted is between about 60° and 70°. It has been found that tilting the feed bar 114 at an angle within this range reduces the possibility of contaminating the exterior of the vessel 100A with oil. An elevating device 120, such as an auxiliary motor or hydraulic unit, may then be used to lower the feed bar 114 into the water to a desired depth below the water surface. In the preferred embodiment, the desired depth is approximately twenty feet below the water surface.

The absorbent material may thereby be dispersed at a level of at least several feet below the water surface. If the absorbent material is sufficiently buoyant, the absorbent material will catch the oil that is beginning to sink down below the water surface and will tend to drive this sinking oil up toward the water surface. The present invention is therefore particularly useful in recovering oil that is trapped in the water column several feet below the water surface, as well as recovering oil that is resting on the water surface itself. The present invention is also particularly well suited for recovering oil in rough seas and bad weather, since the dispersement of the absorbent material below the water surface is relatively unaffected by adverse conditions above the water surface.

In calmer weather the dispersement nozzles 112 may be reversed to a downward position and the feed bar 114 may be positioned out of the water, so that the absorbent material may be sprayed onto the oil spill from above the surface of the water. This arrangement may be preferable for the recovery of spilled oil in calm seas or where relatively little oil has been trapped in the water column below the water surface. The present invention thereby provides for the dispersement of the absorbent material regardless of weather conditions on the water surface.

Recovery of Oil Saturated Absorbent Material

After being dispersed, the absorbent material will contact and absorb the oil. The oil saturated absorbent material will remain suspended on the water surface until it is recovered.

Figure 2:
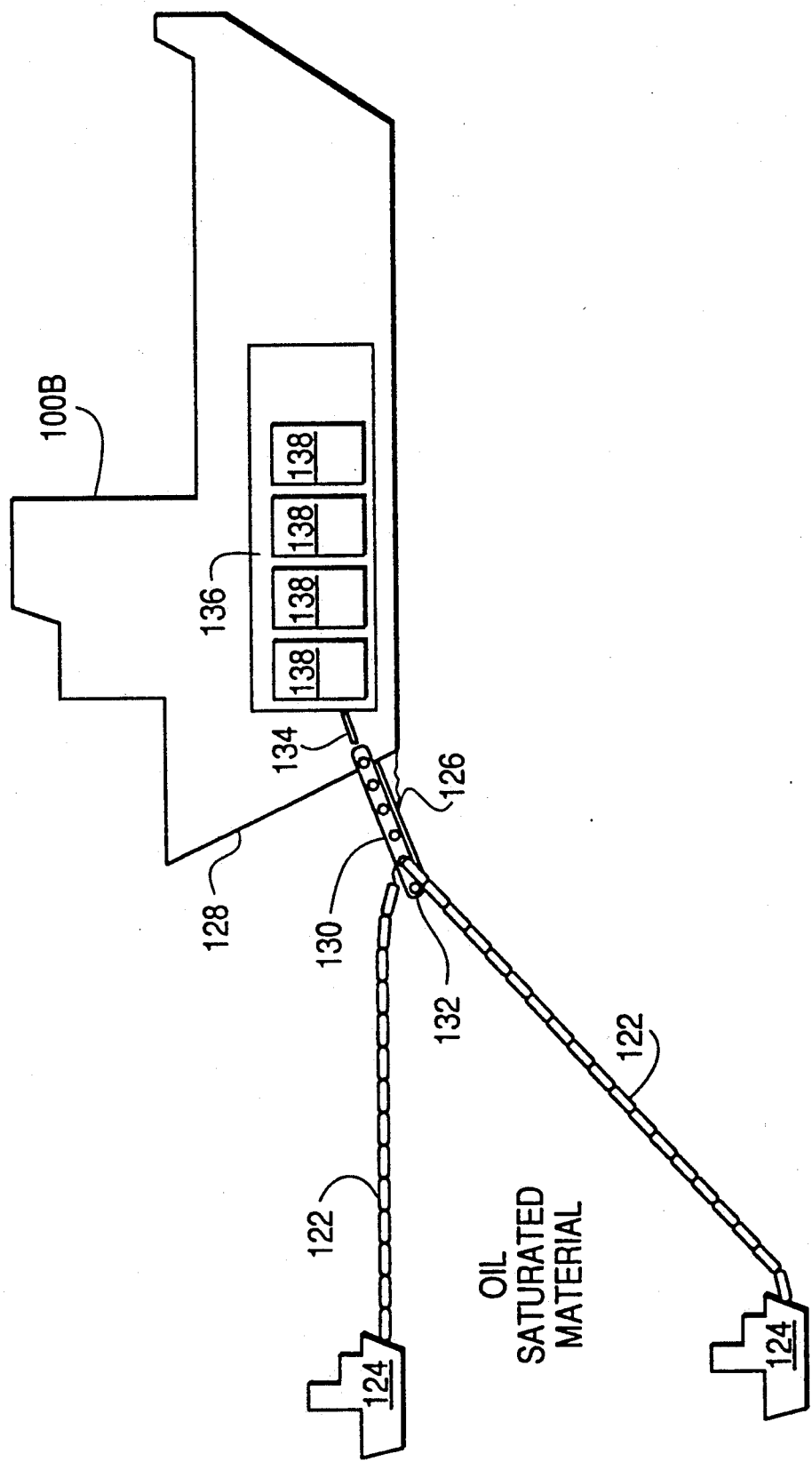
FIG. 2 shows the containment of oil saturated absorbent material in an area adjacent one end of a recovery vessel.

As shown in FIG. 2 with respect to a preferred embodiment of the present invention, the oil saturated absorbent material may be contained within a certain area be means of containment booms 122, examples of which are well known to those of skill in the art. The containment booms 122 may be towed by tug boat vessels 124, which keep the booms 122 taut so that the booms 122 funnel in the oil saturated absorbent material. The containment of the oil saturated absorbent material suspended on the water surface may be accomplished in a variety of other ways which will be apparent to the skilled artisan.

As further shown in FIG. 2 with respect to a preferred embodiment of the present invention, after the oil saturated absorbent material is contained, it may be directed toward one end of a recovery vessel 100B. In the preferred embodiment of the invention, a single vessel is used to perform both the functions of dispersing the absorbent material on the water and recovering the oil saturated absorbent material from the water surface. However, separate vessels may be used to perform the dual functions of dispersing absorbent material and recovering oil saturated absorbent material.

The recovery vessel 100B includes a rear entry door 126 projecting off the stern 128 of the vessel down into the water. The rear entry door 126 used in the present invention is similar in some respects to the rear entry door used in whaling vessels. It is contemplated that mothballed whaling and fish factory processing vessels may be retro-fitted and used as recovery vessels in accordance with the teachings of the present application.

The rear entry door 126 includes a motor driven conveyor belt 130. When the rear entry door 126 is in the down position, the lower edge 132 of the door 126 (including the conveyor belt 130) is located below the level of the water surface. In a preferred embodiment, the lower edge 132 of the door 126 is positioned between five and eight feet below the water surface. As the oil saturated absorbent material approaches the rear entry door 126, the moving conveyor belt 130 lifts the oil saturated material out of the water and toward the interior of the vessel 100B.

Once the oil saturated material is out of the water, one or more industrial vacuum systems 134 positioned near the conveyor belt 130 may be used to vacuum the oil saturated material from the conveyor belt 130 and transfer the material toward an oil stripping area 136, where oil and water may be separated from the saturated absorbent material.

Oil Stripping Process

A variety of oil stripping processes for separating oil and water from saturated material are known to those of skill in the art. Any one of these prior art oil stripping processes may be used in conjunction with the present invention. In a preferred embodiment, the oil stripping process comprises a chemical process which "washes" the oil saturated absorbent material and thereby strips the oil and water out of the saturated absorbent material. As shown in FIG. 2 with respect to the preferred embodiment, the oil stripping process may take place within four or five containers 138 located below the deck 104 of the recovery vessel 100B.

A primary function of the oil stripping process is the removal of oil and water from the oil saturated absorbent material to thereby render the absorbent material reusable. In the preferred embodiment, the oil stripping process is capable of removing as much as 99% of the oil and water from the saturated absorbent material.

After being stripped of oil and water, the absorbent material is available for reuse and may be transferred via a pneumatic system (not shown) directly from the oil stripping area to the containers 102.

The oil removed via the oil stripping process may be transported from the recovery vessel 100B to a tanker or a barge which may run alongside of the recovery vessel 100B. The removed oil may be barrelled and shipped back to the supplier.

Inoculation Process

In an alternative embodiment of the invention, the oil stripped absorbent material may be transferred from the oil stripping area 136 to an inoculation area 140 by means of a pneumatic system (not shown). The primary function of the inoculation area 140 is to inoculate the stripped absorbent material with an agent that will enhance the biodegradation of oil suspended in the absorbent material.

The enhanced biodegradation of the oil suspended in the absorbent material is desirable for at least the following reason. It may not always be possible to recover all of the oil saturated absorbent material from the water surface. For example, the oil saturated material may be carried by wind and ocean currents and may be washed up onto a shoreline before it can be recovered. Because the oil is substantially trapped in the absorbent material, it will remain on the shoreline and will not sink into the shoreline soil. Elimination of the oil from the shoreline may then depend primarily upon the rate at which the oil biodegrades.

The biodegradation of oil may be enhanced by the use of selected bacteria cultures or blends designed to eat polyaromatic hydrocarbons, particularly those found in crude oil. However, the simple spraying of such selected bacteria cultures on contaminated shorelines may present at least two significant problems. First, the shorelines may not be easily accessible. Second, it may take several weeks for the bacteria to establish itself before starting or enhancing the degradation process.

The present invention enables the absorbent material to be inoculated with bacteria prior to its dispersement, thereby enhancing the biodegradation of the oil that is subsequently suspended in the dispersed absorbent material. When the reused absorbent material is applied, if a section of water with the inoculated absorbent material (absorbent material, bacteria and oil) breaks away, there is already bacteria eating away at the oil.

In the present invention, after the oil stripping process, the stripped absorbent material typically contains an organic residue and between 1% and 10% residual oil. This creates a substrate on the absorbent material to which bacteria can attach, thus allowing the inoculation process to begin.

To initiate inoculation of the absorbent material, a mother culture of bacteria may be prepared by suspending and mixing an amount of the bacterial product in warm water. The preferred ratio of bacterial product to water is approximately one kg. of bacteria per ten liters of water. The preferred water temperature is approximately 110° F. The mother culture is preferably allowed to react for a minimum of four hours before being added to an inoculation tank.

The contents of the inoculation tank may be gently stirred for approximately six hours to permit growth of the bacteria and subsequent attachment of the bacteria to the absorbent material. This provides a relatively fast turnaround of inoculated absorbent material. The inoculation process enables the absorbent material to have a biodegradation rate of fifty to five hundred times greater than background.

In an alternative embodiment of the invention, the inoculation area on board the vessel may be eliminated. The inoculation process may be carried out by spraying the absorbent material with selected bacteria cultures or blends designed to eat polyaromatic hydrocarbons as the absorbent material is dispersed on the water.

The present invention thereby provides a substantially self contained oil recovery system. The system requires only a single vessel, may be operated continuously, and does not require the repeated delivery of fresh absorbent material to the oil spill site.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of recovering oil from a layer of oil at an oil spill site on a water surface, the method comprising the steps of:

providing a vessel for transporting buoyant, oil absorbent material to the oil spill site, dispersing the oil absorbent material below the water surface at the oil spill site, whereby the dispersed oil absorbent material advances upward toward the layer of oil and the water surface and absorbs oil and water, containing the dispersed oil absorbent material on the water surface, transferring the contained oil absorbent material from the water surface to the vessel, removing oil and water from the oil absorbent material on the vessel, whereby the oil absorbent material from which oil and water is removed is reuseable.

2. The method of claim 1, further comprising the steps of:

inoculating the oil absorbent material from which oil is removed with an organic oil stripping agent, the step of inoculating including attaching bacteria to the oil absorbent material.

3. The method of claim 1 wherein the oil absorbent material comprises granulated cork.

4. The method of claim 1, further comprising the step of mixing the oil absorbent material with water prior to dispersing the oil absorbent material below the water surface.

5. A system for recovering oil from a layer of oil at an oil spill site on a water surface, the system comprising:

oil absorbent material, wherein the oil absorbent material comprises buoyant, oleophilic, hydrophobic material, a vessel for transporting the buoyant, oil absorbent material to the oil spill site, dispersing means including means for dispersing the oil absorbent material below the water surface at the oil spill site, whereby the dispersed oil absorbent material advances upward toward the water surface and absorbs oil and water, containment means for containing the dispersed oil absorbent material on the water surface, transfer means for transferring the contained oil absorbent material from the water surface to the vessel, removing means for removing oil and water from the oil absorbent material on the vessel.

6. The system of claim 5, further comprising inoculation means for inoculating the oil absorbent material from which oil is removed with oil biodegradation enhancing agents.

7. The system of claim 5 wherein the oil absorbent material comprises granulated cork.

8. The system of claim 5 wherein the dispersing means comprises a feed bar having a plurality of dispersing nozzles for dispersing the oil absorbent material.

9. The system of claim 8 wherein the vessel defines a bow and further comprising means for positioning the feed bar in a horizontally spaced relationship relative to the bow of the vessel, and additionally including means for dispersing the oil absorbent material onto the oil spill site form above the surface of the water.

* * * * *